(12) United States Patent
Kuwahara et al.

(10) Patent No.: US 8,973,403 B2
(45) Date of Patent: Mar. 10, 2015

(54) PROCESS FOR PRODUCING GLASS SUBSTRATE PROVIDED WITH ALUMINUM OXIDE-CONTAINING SILICON OXIDE FILM

(71) Applicant: Asahi Glass Company, Limited, Chiyoda-ku (JP)

(72) Inventors: Yuichi Kuwahara, Chiyoda-ku (JP); Keisuke Abe, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 185 days.

(21) Appl. No.: 13/710,780

(22) Filed: Dec. 11, 2012

(65) Prior Publication Data

US 2013/0098113 A1   Apr. 25, 2013

Related U.S. Application Data

(63) Continuation of application No. PCT/JP2011/063178, filed on Jun. 8, 2011.

(30) Foreign Application Priority Data

Jun. 11, 2010   (JP) ................. 2010-134186

(51) Int. Cl.
*C03C 17/25* (2006.01)
*C03C 17/00* (2006.01)

(52) U.S. Cl.
CPC .............. *C03C 17/25* (2013.01); *C03C 17/002* (2013.01); *C03C 2217/23* (2013.01); *C03C 2218/113* (2013.01)
USPC ............................ 65/60.52; 65/60.5; 427/110

(58) Field of Classification Search
None
See application file for complete search history.

(56) References Cited

U.S. PATENT DOCUMENTS 4,522,847 A * 6/1985 Cornet et al. ............... 427/557
5,750,203 A * 5/1998 Chung .......................... 427/380

(Continued)

FOREIGN PATENT DOCUMENTS

GB       937448 A  *  9/1963
JP       6-48776       2/1994

(Continued)

OTHER PUBLICATIONS

Arbab et al., "Value-Added Flat-Glass Products for the Building, Transportation, Markets, Part 1", American Chemical Society Bulletin, vol. 84, No. 1, Jan. 2005.*

(Continued)

*Primary Examiner* — Lisa Herring
(74) *Attorney, Agent, or Firm* — Oblon, Spivak, McClelland, Maier & Neustadt, L.L.P.

(57) ABSTRACT

A process for producing a glass substrate provided with an aluminum oxide-containing silicon oxide film, which comprises applying a coating liquid containing an organopolysiloxane and an organic aluminum complex to a glass substrate within a temperature range of from 400 to 650° C. to form an aluminum oxide-containing silicon oxide film on the glass substrate, and a process for producing a glass substrate comprising forming molten glass into a glass ribbon, annealing the glass ribbon and cutting it to produce a glass substrate, wherein a coating liquid containing an organopolysiloxane and an organic aluminum complex is applied to the glass ribbon at a position where the glass ribbon is within a temperature range of from 400 to 650° C. to form an aluminum oxide-containing silicon oxide film on the glass ribbon.

15 Claims, 1 Drawing Sheet

(56) References Cited

U.S. PATENT DOCUMENTS

| | | | |
|---|---|---|---|
| 6,120,850 | A | 9/2000 | Kawazu et al. |
| 2010/0143600 | A1 | 6/2010 | Saito et al. |
| 2010/0210764 | A1* | 8/2010 | Mizukami et al. ............ 524/105 |

FOREIGN PATENT DOCUMENTS

| | | |
|---|---|---|
| JP | 7-97237 | 4/1995 |
| JP | 10-316885 | 12/1998 |
| WO | WO 2008/139920 A1 | 11/2008 |

OTHER PUBLICATIONS

Pulker, "Coatings on Glass", Elsevier, pp. 136-138, 1999.*
Shin-Etsu, "Shin-Etsu Silicone Reactive & Non-Reactive Modified Silicone Fluid", Brochure 2006.*
U.S. Appl. No. 13/710,754, filed Dec. 11, 2012, Kuwahara, et al.
International Search Report issued Jul. 12, 2011, in International Application No. PCT/JP2011/063178.

* cited by examiner

PROCESS FOR PRODUCING GLASS SUBSTRATE PROVIDED WITH ALUMINUM OXIDE-CONTAINING SILICON OXIDE FILM

TECHNICAL FIELD

The present invention relates to a process for producing a glass substrate provided with an aluminum oxide-containing silicon oxide film.

BACKGROUND ART

In order to adjust optical properties (such as the reflectance and the transmittance) of a glass substrate, formation of a thin film of an inorganic oxide on a glass substrate has been conducted.

As a method of forming a thin film of an inorganic oxide at a low cost, a method has been known wherein a coating liquid containing a precursor to be an inorganic oxide by thermal decomposition is sprayed over a glass substrate at high temperature so that the precursor is thermally decomposed to form a thin film of an inorganic oxide on the glass substrate. The thin film having a low reflectance and a high transmittance to be formed by this method is theoretically preferably a thin film consisting substantially solely of silicon oxide (hereinafter referred to as a silicon oxide film) in view of the refractive index.

However, even if an organic silicon compound alone is contained in the coating liquid, no silicon oxide film is formed at all, or the organic silicon compound is formed into white particles, and no product preferred as a commercial product will be obtained (paragraph [0007] in Patent Document 1).

Accordingly, in Patent Document 1, a specific organic metal compound (an organic titanium compound, an organic zirconium compound or an organic tin compound) to increase the reactivity of a low molecular weight organic silicon compound is added to the coating liquid. According to Tables 1 and 3 in Patent Document 1, the refractive index of the thin film is from 1.55 to 1.71.

PRIOR ART DOCUMENT

Patent Document

Patent Document 1: JP-A-7-097237

DISCLOSURE OF INVENTION

Technical Problem

However, according to a conventional production process, the refractive index (from 1.55 to 1.71) of a thin film is higher than the refractive index (1.51 to 1.53) of a common highly transparent glass substrate, and the obtainable glass substrate provided with a thin film will not have a low reflectance.

The present invention provides a process for producing a glass substrate provided with an aluminum oxide-containing silicon oxide film having a low refractive index and a high light transmittance, with good production efficiency, with which an aluminum oxide-containing silicon oxide film excellent in the moisture resistance can be directly formed on a glass substrate at high temperature.

The present invention further provides a process for producing a glass substrate via a glass ribbon (a sheet-form continuous formed product of glass), which comprises directly forming an aluminum oxide-containing silicon oxide film excellent in the moisture resistance on the glass ribbon at high temperature, with which a glass substrate provided with an aluminum oxide-containing silicon oxide film having a low refractive index and a high light transmittance can be produced with good production efficiency.

Solution to Problem

The process for producing a glass substrate provided with an aluminum oxide-containing silicon oxide film of the present invention relates to the following embodiments (1) and (2).

(1) A process for producing a glass substrate provided with an aluminum oxide-containing silicon oxide film, which comprises applying a coating liquid containing an organopolysiloxane and an organic aluminum complex to a glass substrate within a temperature range of from 400 to 650° C. to form an aluminum oxide-containing silicon oxide film on the glass substrate.

In the embodiment (1), it is preferred to use, as the organopolysiloxane, an organopolysiloxane having a main exothermic peak when heated at a heating rate of 10° C./min within a range of at least 300° C. and less than the temperature of the glass substrate when the coating liquid is applied.

Further, it is preferred that the difference between the main exothermic peak temperature of the organopolysiloxane when heated at a heating rate of 10° C./min and the temperature of the glass substrate when the coating liquid is applied, is at least 30° C.

Further, it is preferred that the coating liquid further contains a liquid medium.

Further, it is preferred that the boiling point of the liquid medium is at least 60° C.

Further, it is preferred that the organopolysiloxane is a silicone oil.

Further, it is preferred that the silicone oil is a silicone oil represented by the following formula (1):

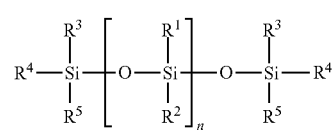

Further, it is preferred that the viscosity average molecular weight of the silicone oil s from 3,500 to 130,000.

Further, it is preferred that the content of the organic aluminum complex to the content of the organopolysiloxane in the coating liquid is from 0.005 to 0.25 by the mass ratio.

(2) A process for producing a glass substrate provided with an aluminum oxide-containing silicon oxide film, which is a process for producing a glass substrate comprising forming molten glass into a glass ribbon, annealing the glass ribbon and cutting it to produce a glass substrate, wherein a coating liquid containing an organopolysiloxane and an organic aluminum complex is applied to the glass ribbon at a position where the glass ribbon is within a temperature range of from 400 to 650° C. to form an aluminum oxide-containing silicon oxide film on the glass ribbon.

In the embodiment (2), it is preferred that the molten glass is formed into a glass ribbon in a float bath, and the coating liquid is applied between the float bath and the annealing step or in the annealing step.

Further, it is preferred to use, as the organopolysiloxane, an organopolysiloxane having a main exothermic peak when heated at a heating rate of 10° C./min within a range of at least 300° C. and less than the temperature of the glass ribbon when the coating liquid is applied.

Further, it is preferred that the difference between the main exothermic peak temperature of the organopolysiloxane when heated at a heating rate of 10° C./min and the temperature of the glass ribbon at a position where the coating liquid is applied, is at least 30° C.

Further, it is preferred that the coating liquid further contains a liquid medium. Further, it is preferred that the boiling point of the liquid medium is at least 60° C.

Further, it is preferred that the organopolysiloxane is a silicone oil.

Further, it is preferred that the silicone oil is a silicone oil represented by the above formula (1).

Further, it is preferred that the viscosity average molecular weight of the silicone oil is from 3,500 to 130,000.

Further, it is preferred that the content of the organic aluminum complex to the content of the organopolysiloxane in the coating liquid is from 0.005 to 0.25 by the mass ratio.

Advantageous Effects of Invention

According to the process for producing a glass substrate provided with an aluminum oxide-containing silicon oxide film of the present invention, an aluminum oxide-containing silicon oxide film excellent in the moisture resistance can be directly formed on a glass substrate or a glass ribbon at high temperature, and a glass substrate provided with an aluminum oxide-containing silicon oxide film having a low refractive index and a high light transmittance can be produced with good production efficiency.

DESCRIPTION OF EMBODIMENTS

Figure 1:
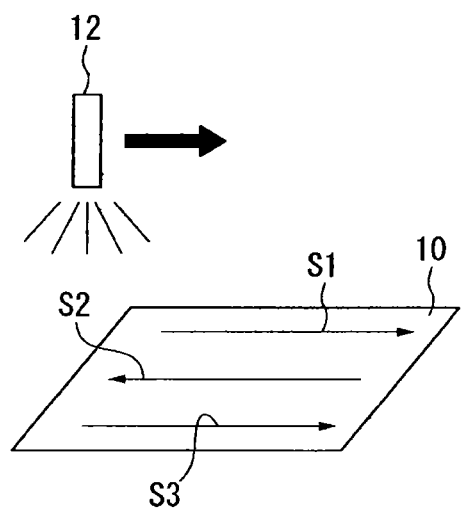
FIG. 1 is a perspective view illustrating one example of the application method in Examples.

<Process for Producing Glass Substrate Provided with Aluminum Oxide-Containing Silicon Oxide Film>

The process for producing a glass substrate provided with an aluminum oxide-containing silicon oxide film of the present invention is a process which comprises applying a coating liquid containing an organopolysiloxane and an organic aluminum complex (hereinafter they will sometimes be generally referred to as precursors) to a glass substrate or a glass ribbon to be a glass substrate, and thermally decomposing the precursors to form an aluminum oxide-containing silicon oxide film on the glass substrate or the glass ribbon.

(Glass Substrate)

The material of the glass substrate may, for example, be soda lime silica glass, borosilicate glass or aluminosilicate glass. Further, the glass substrate is preferably a raw glass substrate which is not reinforced, since it is applied to a process for producing a glass substrate comprising forming molten glass into a glass ribbon, annealing the glass ribbon and cutting it to produce a glass substrate, wherein an organopolysiloxane is applied to the glass ribbon to form an aluminum oxide-containing silicon oxide film on the glass ribbon.

In a case where the glass substrate is made of highly transparent glass, the refractive index at a wavelength of 633 nm is 1.51 for example.

(Organopolysiloxane)

The organopolysiloxane means a polymer having siloxane bonds (—Si—O—Si—) as a skeleton and having organic groups bonded to the silicon atoms. Each organic group is an organic group in which the atom bonded to the silicon atom is a carbon atom. To some of the silicon atoms, an atom or a group (for example, a hydrogen atom, a hydroxy group or a hydrolyzable group) other than the organic group may be bonded. A hydrolyzable group is a group capable of being converted to a hydroxy group by reaction with water, and may, for example, be a halogen atom (such as a chlorine atom), a group in which the atom bonded to the silicon atom is an oxygen atom (such as an alkoxy group or an acyl group) or a group in which the atom bonded to the silicon atom is a nitrogen atom (such as an amino group). Unlike the hydrolyzable group, the above organic group is nonhydrolyzable.

The organic group which is a nonhydrolyzable group is preferably a hydrocarbon group (an organic group comprising carbon atoms and hydrogen atoms). Further, the organic group may be an organic group having a hetero atom (such as an oxygen atom or a nitrogen atom), an organic group having a halogen atom (such as a fluorine atom) or the like. The hetero atom may be part of a reactive group (such as an epoxy group, a carboxy group or an amino group). The hydrocarbon group may, for example, be an alkyl group (such as a methyl group or an ethyl group), an alkenyl group (such as a vinyl group, an allyl group or an ethynyl group) or an aryl group (such as a phenyl group).

The organopolysiloxane may, for example, be a linear polymer in which the skeleton of the siloxane bonds has a linear structure, a branched polymer in which the skeleton has a branched structure, a crosslinked polymer in which the skeleton has a network structure, or a three-dimensional crosslinked polymer in which the skeleton has a three-dimensional network structure. Further, as another organopolysiloxane, a crosslinked polymer in which at least two skeletons of the siloxane bonds having a linear structure are connected with a bivalent or higher valent organic group (such as an alkylene group), a polymer in which the skeleton of the siloxane bonds and an organic polymer skeleton having no siloxane bond are bonded, may, for example, be mentioned.

As the organopolysiloxane in the present invention, any of the above-mentioned organopolysiloxanes may be used so long as it is thermally decomposed and converted to silicon oxide on the glass substrate or the glass ribbon at a temperature within a range of from 400 to 650° C. Particularly, an organopolysiloxane which is liquid by itself, one which can be soluble in a liquid medium to be a solution, or one which can be dispersed in a liquid medium to be a dispersion is preferred.

The organopolysiloxane in the present invention is preferably a linear polymer in view of the deposition efficiency of the aluminum oxide-containing silicon oxide film and availability, particularly preferably a linear diorganopolysiloxane among the above organopolysiloxanes. A diorganopolysiloxane is a polymer having silyloxy groups to which two organic groups are bonded as repeating units, and in a linear diorganopolysiloxane, three organic groups are bonded to the silicon atom at each terminal. Some of the organic groups may be a hydrogen atom. Each organic group is usually an alkyl group (particularly a methyl group) having at most 4 carbon atoms, and some of the organic groups may be an alkenyl group or a phenyl group. Further, each organic group may be an organic group having a hetero atom (such as an oxygen atom or a nitrogen atom), an organic group having a halogen atom (such as a fluorine atom) or the like, as mentioned above.

The organopolysiloxane in the present invention is particularly preferably a silicone oil in view of the deposition efficiency of the aluminum oxide-containing silicon oxide film and the viscosity (handling efficiency) of the coating liquid. The silicone oil in the present invention means a linear organopolysiloxane which is an oily compound having fluidity at room temperature. The silicone oil is usually represented by the following formula (1):

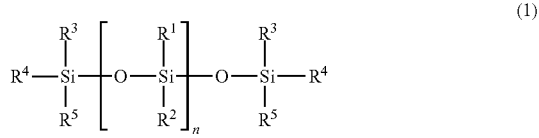

(1)

wherein each of $R^1$ to $R^5$ is an organic group or a hydrogen atom, and n is an integer of at least 1, provided that when $R^1$ to $R^5$ are organic groups, they may be the same or different. The bifunctional unit in the bracket [ ] is usually called D unit, and each of monofunctional units outside the bracket [ ] at both terminals is called M unit. In a case where n is an integer of at least 2 (that is, in a case where there are two or more D units), such D units may be different from each other. The two M units may also be different from each other. D units being different from each other means that they are different in at least one of $R^1$ and $R^2$. M units being different from each other means that they are different in at least one of $R^3$, $R^4$ and $R^5$.

The silicone oil represented by the formula (1) is preferably a silicone oil wherein all $R^1$ to $R^5$ are a methyl group, or a silicone oil wherein some of $R^1$ to $R^5$ are a hydrogen atom or an organic group other than a methyl group, and the others are a methyl group. Hereinafter, in a case where all $R^1$ to $R^5$ are a methyl group, such D unit will be referred to as $D^1$ unit and such M unit will be referred to as $M^1$ unit. On the other hand, D unit wherein one of $R^1$ and $R^2$ is a methyl group and the other is a hydrogen atom or an organic group other than a methyl group will be referred to as $D^2$ unit, and M unit wherein two of $R^3$ to $R^5$ are a methyl group and the other one is a hydrogen atom or another organic group will be referred to as $M^2$ unit. According to this representation, a silicone oil represented by the formula (1) wherein all $R^1$ to $R^5$ are a methyl group can be represented by $M^1(D^1)_n M^1$. In a case where the silicone oil represented by the formula (1) has a hydrogen atom or an organic group other than a methyl group, bonded to a silicon atom, preferred is a silicone oil represented by $M^1(D^1)_p(D^2)_q M^1$, a silicone oil represented by $M^2(D^1)_n M^2$ or a silicone oil represented by $M^2(D^1)_p(D^2)_q M^2$ (wherein each of p and q is an integer of at least 1, and p+q=n). The organic group other than a methyl group is preferably an alkyl group (such as an ethyl group) having at least 2 carbon atoms, a polyfluoroalkyl group, a phenyl group, an organic group having a hetero atom (such as an oxygen atom or a nitrogen atom) (particularly an organic group having a reactive group (such as an epoxy group or an amino group)) or the like.

A silicone oil wherein all $R^1$ to $R^5$ are a methyl group is called dimethyl silicone oil. Further, a silicone oil wherein some of $R^1$ to $R^5$ are a phenyl group and the others are a methyl group is called methyl phenyl silicone oil, and a silicone oil wherein some of $R^1$ to $R^5$ are a hydrogen atom and the others are a methyl group is called methyl hydrogen silicone oil. Further, a silicone oil wherein some of $R^1$ to $R^5$ are a long chain alkyl group (preferably a $C_{6-22}$ linear alkyl group), an organic group having a hetero atom (such as an oxygen atom or a nitrogen atom) or an organic group having a halogen atom (such as a fluorine atom) and the others are a methyl group is called a modified silicone oil. In the present invention, the silicone oil is meant to include the modified silicone oil. The modified silicone oil is called, for example, epoxy-modified silicone oil, carboxy-modified silicone oil, long chain alkyl-modified silicone oil, amino-modified silicone oil or polyether-modified silicone oil, depending on the type of the organic group other than a methyl group or the type of a reactive group which this organic group has. The silicone oil in the present invention is preferably an epoxy-modified silicone oil or a long chain alkyl-modified silicone oil in view of the deposition efficiency of the aluminum oxide-containing silicon oxide film, particularly preferably a long chain alkyl-modified silicone oil.

n in the formula (1) represents the degree of polymerization, and among silicone oils wherein $R^1$ to $R^5$ are the same, usually the higher n is, the higher the viscosity is. Accordingly, the value of n (i.e. the molecular weight) can be measured by the viscosity of a silicone oil, and such a molecular weight is called viscosity average molecular weight. The silicone oil in the present invention is preferably a silicone oil having a viscosity average molecular weight of from 3,500 to 130,000, more preferably a silicone oil of from 3,500 to 100,000, further preferably a silicone oil of from 6,000 to 55,000.

When the silicone oil has a viscosity average molecular weight of at least 3,500, it will hardly be vaporized before the coating liquid is attached to the glass substrate or the glass ribbon, whereby the deposition efficiency of the aluminum oxide-containing silicon oxide film will be good. When the silicone oil has a viscosity average molecular weight of at most 130,000, the haze can be suppressed low, and a transmittance can be maintained high. Further, the viscosity of the silicone oil will not be too high, whereby good handling efficiency will be obtained.

The viscosity average molecular weight of a silicone oil is obtained by the following procedure.

(I) The kinematic viscosity η (25° C. and 40° C.) of the silicone oil is obtained.

(II) When the kinematic viscosity η is at least 100 mm²/sec, the molecular weight M is obtained from Barry's formula of the following formula (2). When the kinematic viscosity η is less than 100 mm²/sec, the molecular weight M is obtained from Warrik's formula of the following formula (3).

$$\log \eta^{cs/25° C.} = 1.00 + 0.0123 M^{0.5} \tag{2}$$

$$\log \eta^{p/40° C.} = 1.43 \log M - 5.54 \tag{3}$$

wherein $\eta^{cs/25° C.}$: the kinematic viscosity at 25° C., $\eta^{p/40° C.}$: the viscosity at 40° C., M: viscosity average molecular weight.

Further, as the organopolysiloxane in the present invention, in addition to the silicone oil, an organopolysiloxane which can be thermally decomposed to be converted to silicon oxide on a glass substrate or a glass ribbon within a temperature range of from 400 to 650° C. may be used. Such an organopolysiloxane may, for example, be a silicone resin, a silicone rubber, a silicone elastomer or a compound having a siloxane bond as a skeleton which is a material therefor.

A silicone resin is a curable organopolysiloxane comprising, as the main constituting units, trifunctional units represented by $R^6 SiO_{3/2}$ (wherein $R^6$ is the same organic group as for the above $R^1$ to $R^5$) in which one organic group is bonded to a silicone atom, called T units. The silicone resin may have the above D unit in addition to T units. Further, it may have a tetrafunctional unit (represented by $SiO_{4/2}$) called Q unit or the above M unit. The silicone resin before curing may be used as the organopolysiloxane in the present invention. A silicone rubber and a silicone elastomer are polymers obtainable by crosslinking a crosslinkable organopolysiloxane (an organopolysiloxane having a crosslinkable organic group (such as a vinyl group), an organopolysiloxane having a silicon atom to which a silanol group or a hydrolyzable group is bonded or the like), and the crosslinked polymer or the crosslinkable organopolysiloxane as the material may be used as the organopolysiloxane in the present invention.

As the organopolysiloxane used in the present invention, in a case where the coating liquid containing the organopolysiloxane is applied to a glass substrate, an organopolysiloxane having a main exothermic peak when heated at a heating rate of 10° C./min within a range of at least 300° C. and less than the temperature of the glass substrate when the coating liquid is applied, is preferred. Further, in a case where the coating liquid containing the organopolysiloxane is applied to a glass ribbon, it is preferably an organopolysiloxane having a main exothermic peak when heated at a heating rate of 10° C./min within a range of at least 300° C. and less than the temperature of the glass ribbon at a position where the coating liquid is applied. The temperature at a position where the main exothermic peak appears when the organopolysiloxane is heated at a heating rate of 10° C./min will hereinafter be referred to as an exothermic peak temperature.

At the exothermic peak temperature or higher, the organopolysiloxane is thermally decomposed to be converted to silicon oxide. Accordingly, an organopolysiloxane having an exothermic peak temperature lower than the temperature of the glass substrate when the coating liquid is applied or the temperature of the glass ribbon at a position where the coating liquid is applied is used. In other words, when an organopolysiloxane having a certain exothermic peak temperature is used, the temperature of the glass substrate to which the coating liquid is applied is set to be a temperature exceeding the exothermic peak temperature, and the position at which the coating liquid is applied to a glass ribbon is set to be a position at which the temperature of the glass ribbon exceeds the exothermic peak temperature.

The temperature of the glass substrate when the coating liquid is applied or the temperature of the glass ribbon at a position where the coating liquid is applied is from 400 to 650° C. Accordingly, the organopolysiloxane used in the present invention is selected from ones having an exothermic peak temperature at least less than 650° C.

Further, if the temperature of the glass substrate or the glass ribbon and the exothermic peak temperature of the organopolysiloxane are close to each other, the rate of the thermal decomposition reaction by which the organopolysiloxane is converted to silicon oxide tends to be low. Accordingly, byproducts such as carbides may remain, and the productivity may be insufficient. The difference between both the temperatures is preferably at least 30° C., more preferably at least 50° C., and in order to obtain a sufficient reaction rate, it is further preferably at least 100° C. Considering these conditions, the organopolysiloxane to be used in the present invention is preferably selected from organopolysiloxanes having an exothermic peak temperature within a range of at least 300° C. and less than the temperature of the glass substrate when the coating liquid is applied or the temperature of the glass ribbon at a position where the coating liquid is applied.

By the exothermic peak temperature being at least 300° C., in a case where the coating liquid is applied e.g. by spraying by means of a spray method, the organopolysiloxane is less likely to be thermally decomposed before it reaches the surface of the glass substrate or the glass ribbon. When the exothermic peak temperature is less than the temperature of the glass substrate when the coating liquid is applied or the temperature of the glass ribbon at a position where the coating liquid is applied, film-deposition reaction will take place immediately after the organopolysiloxane reaches the surface of the glass substrate or the glass ribbon, whereby an aluminum oxide-containing silicon oxide film can be formed on the glass substrate or the glass ribbon with a good film deposition efficiency.

(Organic Aluminum Complex)

The organic aluminum complex in the present invention is not limited so long as it is thermally decomposed and converted to aluminum oxide on the glass substrate or the glass ribbon at a temperature within the above range. Particularly, an organic aluminum complex which is liquid, one which can be soluble in a liquid medium to be a solution, or one which can be dispersed in a liquid medium to be a dispersion is preferred.

The organic aluminum complex in the present invention may, for example, be aluminum acetylacetonate, aluminum bisethylacetoacetate monoacetylacetonate, aluminum-di-n-butoxide-monoethylacetoacetate, aluminum-di-isopropoxide-monomethylacetoacetate or diisopropoxyaluminum ethylacetate, and is particularly preferably aluminum acetylacetonate in view of a good deposition efficiency of the aluminum oxide-containing silicon oxide film.

(Liquid Medium)

The liquid medium to be used for the solution of the precursors may be a solvent in which the precursors are dissolved, and it may, for example, be a hydrocarbon (such as a saturated aliphatic hydrocarbon or an aromatic hydrocarbon), an unsaturated hydrocarbon, dichloroethane, trichloroethylene, chlorobenzene, dimethylformamide, methanol, ethanol, acetone, cyclohexanone or acetylacetone.

The liquid medium to be used for the dispersion (including an emulsion) of the precursors may be one in which the precursors are not soluble, and specifically, water may be mentioned. Further, depending on the type of the precursors, an organic solvent in which they are not soluble may be used, and the above solvent may be mentioned.

In a case where the coating liquid is applied e.g. by spraying by means of a spray method, the liquid medium in the coating liquid may be one which is evaporated and removed before the coating liquid reaches the surface of the glass substrate or the glass ribbon, or may be one which is evaporated and removed after the coating liquid reaches the surface of the glass substrate or the glass ribbon at high temperature. In order to form a uniform aluminum oxide-containing silicon oxide film on the glass substrate or the glass ribbon, it is preferred that the precursors are thermally decomposed after a film of the precursors is formed on the glass substrate or the glass ribbon. Accordingly, it is preferred that a liquid medium having a relatively high boiling point is used, and after a film of the precursors containing the liquid medium is formed on the glass substrate or the glass ribbon, the liquid medium is evaporated.

The boiling point of the liquid medium is preferably at least 60° C., more preferably at least 65° C. When the boiling point of the liquid medium is at least 60° C., the liquid medium is less likely to be vaporized before the coating liquid is attached to the surface of the glass substrate or the glass ribbon at high temperature, whereby a good deposition efficiency of the aluminum oxide-containing silicon oxide film will be obtained. The upper limit of the boiling point of the liquid medium is not limited so long as the liquid medium has a boiling point lower than the temperature of the surface of the glass substrate or the glass ribbon to which the coating liquid is applied. However, usually a liquid medium having a boiling point less than 300° C. is used. In order to quickly remove the liquid medium by evaporation on the glass substrate or the glass ribbon, the boiling point of the liquid medium is preferably at most 250° C. The boiling point of the liquid medium is more preferably from 80 to 200° C.

(Coating Liquid)

The coating liquid contains an organopolysiloxane and an organic aluminum complex, and preferably further contains a liquid medium in view of the deposition efficiency of the aluminum oxide-containing silicon oxide film and the viscosity (handling efficiency) of the coating liquid. However, when the viscosity of the organopolysiloxane is sufficiently low, the liquid medium is not necessarily required.

The film component concentration in the coating liquid (the concentration of the precursors of the film components in the coating liquid) is preferably from 5 to 90 mass %, more preferably from 10 to 80 mass %, in view of the deposition efficiency of the aluminum oxide-containing silicon oxide film and the viscosity (handling efficiency) of the coating liquid.

The proportion of the organopolysiloxane is preferably from 5 to 90 mass %, more preferably from 10 to 80 mass %, per 100 mass % of the film components in the coating liquid (the precursors of the film components in the coating liquid). When the proportion of the organopolysiloxane is at least 5 mass %, the refractive index of the aluminum oxide-containing silicon oxide film can be suppressed to be low. When the proportion of the organopolysiloxane is at most 90 mass %, the moisture resistance of the obtainable glass substrate provided with an aluminum oxide-containing silicon oxide film will be good.

The content of the organic aluminum complex to the content of the organopolysiloxane is preferably from 0.005 to 0.25 by the mass ratio, more preferably from 0.005 to 0.1. When the content of the organic aluminum complex to the content of the organopolysiloxane is at least 0.005 by the mass ratio, the moisture resistance of the obtainable glass substrate provided with an aluminum oxide-containing silicon oxide film will be good. Further, when the content of the organic aluminum complex to the content of the organopolysiloxane is at most 0.25 by the mass ratio, the refractive index of the aluminum oxide-containing silicon oxide film can be suppressed to be low.

(Application of Coating Liquid)

Application of the coating liquid is carried out by applying a coating liquid comprising liquid precursors or a coating liquid comprising a solution or a dispersion of the precursors, to the glass substrate or the glass ribbon.

The method of applying the coating liquid is preferably a spray method of spraying a coating liquid containing the precursors and a liquid medium by means of a nozzle (for example, a spray gun), with a view to producing a glass substrate having an aluminum oxide-containing silicon oxide film with good production efficiency.

As a specific application method by the spray method, the following methods (i) and (ii) may, for example, be mentioned, and the method (ii) is preferred in view of the small number of steps and with a view to producing a glass substrate having an aluminum oxide-containing silicon oxide film with better production efficiency.

(i) A method of spraying a coating liquid over a glass substrate from a nozzle while the nozzle is moved above the fixed glass substrate.

(ii) A method of spraying a coating liquid over a glass ribbon from a nozzle provided at a position where the glass ribbon moving in one direction is within the after-mentioned temperature range. It is particularly preferred to spray the coating liquid over a glass ribbon obtained by forming molten glass in a float bath, between the float bath and an annealing step or in the annealing step.

The temperature of the glass substrate or the glass ribbon when the coating liquid is applied is from 400 to 650° C., and the precursors are thermally decomposed and converted to oxides on the glass substrate or the glass ribbon within the above temperature range. The temperature of the glass substrate or the glass ribbon when the coating liquid is applied is more preferably from 500 to 650° C. If the temperature of the glass substrate or the glass ribbon is less than 400° C., it will take long until the precursors on the glass substrate are thermally decomposed to oxides, thus leading to low productivity. When the temperature of the glass substrate or the glass ribbon is at most 650° C., the coating liquid is sprayed at a position where the glass ribbon has exited the float bath, not in the float bath, whereby the atmosphere in the float bath will hardly be contaminated during the spraying.

Here, the temperature of the glass substrate or the glass ribbon means a surface temperature on a side to which the coating liquid is applied.

In a case where the coating liquid is applied to the glass ribbon, the coating liquid is applied to the glass ribbon at a position where the glass ribbon is within a temperature range of from 400 to 650° C. The position where the coating liquid is to be applied is more preferably a position where the glass ribbon is within a temperature range of from 500 to 650° C. In a case where a glass substrate is produced by the float process, the temperature of the glass ribbon at a position immediately after the float bath is usually at a level of 650° C. in the case of soda lime glass, although it depends on the glass composition of the glass substrate. Accordingly, a temperature of the glass ribbon at a position where the coating liquid is applied higher than 650° C. is not realistic. The glass ribbon which has left the float bath is annealed in the annealing step and cooled to at most 400° C. during the annealing step.

The precursors are thermally decomposed and converted to oxides on the glass substrate or the glass ribbon. On that occasion, presence of oxygen is necessary in the thermal decomposition atmosphere. In an atmosphere without oxygen, the organopolysiloxane tends to be depolymerized into a low molecular weight organopolysiloxane, and such a low molecular weight organopolysiloxane, which is a low boiling point compound, is likely to be vaporized. Accordingly, in an atmosphere without oxygen, the organopolysiloxane will not be converted to silicon oxide but is likely to be vaporized and disappear. Accordingly, thermal decomposition of the precursors is carried out in an oxygen-containing atmosphere (for example, in the air or in the atmosphere). In a case where the coating liquid is applied to a glass ribbon formed by the float process, the application position is at the downstream of the float bath outlet. Since the interior of the float bath is usually kept in a reducing atmosphere, an aluminum oxide-containing silicon oxide film will hardly form even if the coating liquid is applied to the glass ribbon in the interior of the float bath. At the downstream of the float bath outlet, even if a reducing gas discharged from the float bath is included in the air, usually oxygen in a sufficient amount for formation of oxides is present in the atmosphere. Further, the glass ribbon after the float bath outlet moves to an annealing apparatus (such as an annealing furnace), and the atmosphere in the interior of the annealing apparatus is also usually in a heated air atmosphere. Accordingly, the position at which the coating liquid is applied to the glass ribbon is preferably at a position between the float bath and the annealing step (i.e. a position between the float bath and the annealing furnace), or at a position in the annealing step.

The application amount of the coating liquid is preferably such an amount that the thickness of the aluminum oxide-containing silicon oxide film at the thinnest portion is from 10 to 300 nm.

The thickness of the aluminum oxide-containing silicon oxide film is preferably from 10 to 300 nm. An aluminum oxide-containing silicon oxide film having a thickness within such a range is useful as an antireflection film.

Here, the aluminum oxide-containing silicon oxide film having such a thickness may have a convex portion of 300 nm or thicker. However, in a case where an aluminum oxide-containing silicon oxide film to be used for a purpose other than antireflection is to be formed, its thickness is not limited to the above range.

(Function Effect)

In the above-described process for producing a glass substrate provided with an aluminum oxide-containing silicon oxide film of the present invention, as the coating liquid containing an organopolysiloxane and an organic aluminum complex is applied to a heated glass substrate or glass ribbon, an aluminum oxide-containing silicon oxide film can be formed with good production efficiency as compared with a sputtering method or a CVD method. Further, as an organopolysiloxane is used as a precursor, a thin film containing silicon oxide as the main component can be formed without using a specific organic metal compound (such as an organic titanium compound, an organic zirconium compound or an organic tin compound) to increase the reactivity of the organopolysiloxane as disclosed in Patent Document 1. Further, the film containing silicon oxide as the main component is excellent in the moisture resistance since it contains aluminum oxide. Further, as aluminum oxide has a low refractive index as compared with a specific metal oxide (titanium oxide, zirconium oxide, tin oxide), the refractive index of an aluminum oxide-containing silicon oxide film can be suppressed to be low as compared with a silicon oxide film containing a specific metal oxide. Accordingly, a glass substrate having an aluminum oxide-containing silicon oxide film having a low light reflectance, having a low refractive index and being excellent in the moisture resistance, can be produced with good production efficiency.

Further, with respect to the glass substrate provided with an aluminum oxide-containing silicon oxide film obtained by the production process of the present invention, as the surface of the glass substrate is covered with a thin film of an inorganic oxide, weathering on the surface of the glass substrate can be suppressed.

EXAMPLES

Now, the present invention will be described in further detail with reference to Examples. However, it should be understood that the present invention is by no mean restricted to such specific Examples.

Examples 1 to 5 are Examples of the present invention.
(Exothermic Peak Temperature)

Exothermic peaks which appeared when a silicone oil was heated from 25° C. to 700° C. at a heating rate of 10° C./min were measured by TG-DTA (manufactured by Bruker AXS, ASC 7000S). The temperature at which the highest exothermic peak among the exothermic peaks appeared was regarded as the exothermic peak temperature.

(Kinematic Viscosity)

The kinematic viscosity (25° C. and 40° C.) of a silicone oil was measured by an Ubbellohde viscometer as specified in JIS Z8803 (1991).
(Reflectance)

The one surface reflectance of a glass substrate was measured with respect to a light having a wavelength of from 300 to 1,200 nm by using a spectrophotometer (manufactured by Hitachi High-Technologies Corporation, U4100). In a case where a coating liquid was applied, the one surface reflectance of the glass substrate on the applied side was measured. An integrating sphere was used for detection of the reflected light, and the reflectance including the diffuse reflected light was measured.

(Reduction in Reflectance)

The difference in the reflectance (the reduction in the reflectance) was obtained by subtracting the average of reflectances at wavelengths of from 500 to 550 nm of a glass substrate on which an aluminum oxide-containing silicon oxide film was formed from the average of reflectances at wavelengths of from 500 to 550 nm of a glass substrate on which no aluminum oxide-containing silicon oxide film was formed.

(Transmittance)

The transmittance of a glass substrate was measured with respect to a light having a wavelength of from 300 to 1,200 nm by using a spectrophotometer (manufactured by Hitachi High-Technologies Corporation, U4100). An integrating sphere was used for detection of the transmitted light, and the transmittance including the diffuse transmitted light was measured.

(Increase in Transmittance)

The difference in the transmittance (the increase in the transmittance) was obtained by subtracting the average of transmittances at wavelengths of from 500 to 550 nm of a glass substrate on which no silicon oxide film nor aluminum oxide-containing silicon oxide film was formed, from the average of transmittances at wavelengths of from 500 to 550 nm of a glass substrate on which a silicon oxide film or an aluminum oxide-containing silicon oxide film was formed.

(Exposure Test)

A glass substrate on which a silicon oxide film or an aluminum oxide-containing silicon oxide film was formed was put in a highly accelerated stress test system (manufactured by ESPEC Corp, EHS-211M), and an exposure test was carried out under conditions of a temperature of 110° C., a relative humidity of 85% RH and an exposure time of 48 hours.

(Moisture Resistance)

The increase b in the transmittance of a glass substrate on which a silicon oxide film or an aluminum oxide-containing silicon oxide film was formed after the exposure test was subtracted from the increase a in the transmittance of the glass substrate on which a silicon oxide film or an aluminum oxide-containing silicon oxide film was formed before the exposure test, to obtain the value (a-b). The smaller the value, the more excellent the moisture resistance.

(Refractive Index)

A glass substrate on which an aluminum oxide-containing silicon oxide film was formed was prepared, and by using a reflectance spectral film thickness meter (manufactured by Otsuka Electronics Co., Ltd., Photal FE-3000), the refractive indices at 5 points with film thicknesses of from 70 to 100 nm from the film surface at a wavelength of 633 nm were measured, and the average was regarded as the refractive index.

Examples 1 to 4

A long chain alkyl-modified silicone oil (manufactured by Shin-Etsu Silicone, X-22-7322, exothermic peak temperature: 480° C., viscosity average molecular weight: 6,000) and a toluene (manufactured by JUNSEI CHEMICAL CO., LTD., boiling point: 110.7° C.) solution of aluminum acetylacetonate (manufactured by JUNSEI CHEMICAL CO., LTD.) (aluminum acetylacetonate: 50 mass %, toluene: 50 mass %) were dissolved in n-decane (manufactured by KANTO CHEMICAL CO., INC., boiling point: 174.1° C.) to obtain a coating liquid containing an organopolysiloxane and an organic aluminum complex at a film component concentration as shown in Table 1 in a ratio as shown in Table 1. Here, the content of aluminum acetylacetonate to the content of the silicone oil in the coating liquid was 0.007 in Example 1, 0.021 in Example 2, 0.071 in Example 3 and 0.214 in Example 4.

As an application apparatus, KM-100 (manufactured by SPD Laboratory Inc.) was used. As a glass substrate, soda lime glass (manufactured by Asahi Glass Company, Limited) of 10 cm×10 cm×3 mm was used. The refractive index of the glass substrate at a wavelength of 633 nm is 1.51.

The glass substrate was placed on a stage, and a heater was provided on the rear side of the stage not to be in contact with the stage. The glass substrate was heated to 600° C. via the stage by the radiant heat of the heater. The temperature of the glass substrate was measured by bringing a thermocouple in contact with one side surface of the glass substrate. Since the glass substrate was heated for a sufficient time before the coating liquid was sprayed by a spray gun, the temperature measured here can be considered to be substantially the same as the surface temperature of the glass substrate.

After the glass substrate was heated to 600° C., as shown in FIG. 1, the coating liquid was sprayed over the glass substrate 10 from a spray gun 12 while the spray gun 12 was moved in three steps S1 to S3 above the glass substrate 10. Regarding three steps S1 to S3 as one cycle, application was carried out in five cycles. Further, when the coating liquid was sprayed from the spray gun 12, the liquid-sending pressure to the spray gun 12 was adjusted so that the liquid-sending rate would be from 0.4 to 0.6 mL/sec, and the spraying pressure was set to 0.1 MPa. The application time in each step was 10 seconds. Spraying was carried out in a state where the stage, the glass substrate and the spray gun were surrounded by an explosion-proof apparatus, and the ambient temperature was not adjusted.

The reduction in the reflectance and the increase in the transmittance of the glass substrate on which an aluminum oxide-containing silicon oxide film was formed were measured. Further, the moisture resistance was evaluated. The results are shown in Table 1.

highly transparent glass is usually from 1.51 to 1.53. Accordingly, the refractive index of the glass substrate provided with an aluminum oxide-containing silicon oxide film produced by the production process of the present invention is lower than the refractive index of a conventional glass substrate as highly transparent glass. Therefore, according to the process for producing a glass substrate provided with an aluminum oxide-containing silicon oxide film of the present invention, it is possible to provide a glass substrate provided with an aluminum oxide-containing silicon oxide film sufficiently having a low reflectance.

Further, as is shown in Table 1, the values as results of the moisture resistance test of the glass substrate provided with an aluminum oxide-containing silicon oxide film produced by the production process of the present invention are so low as from 0.18 to 0.38, thus indicating excellent moisture resistance. Therefore, the glass substrate provided with an aluminum oxide-containing silicon oxide film produced by the production process of the present invention can be used under high humidity conditions over a long period of time. Therefore, according to the process for producing a glass substrate provided with an aluminum oxide-containing silicon oxide film of the present invention, it is possible to provide a glass substrate provided with an aluminum oxide-containing silicon oxide film with high reliability.

Example 5

Figure 2:
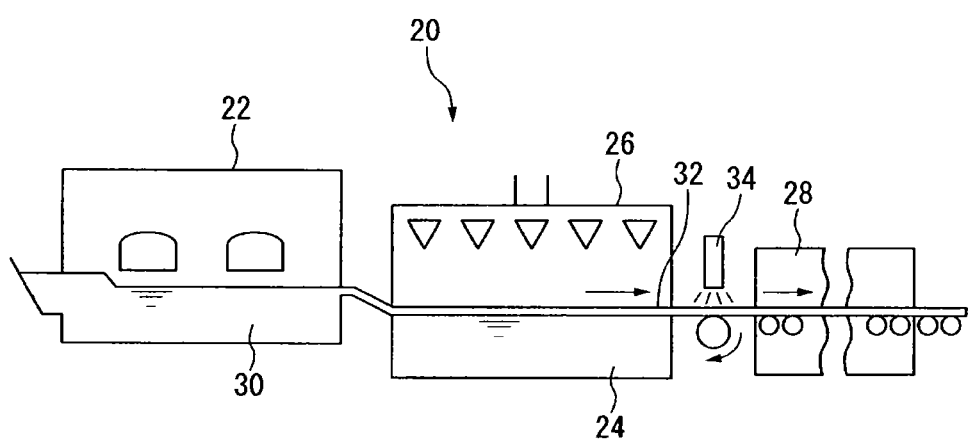
FIG. 2 is a view schematically illustrating one example of a glass production apparatus to carry out the production process of the present invention.

Using a glass production apparatus shown in FIG. 2, a glass substrate on which an aluminum oxide-containing silicon oxide film is formed is produced. A glass production apparatus 20 comprises a melting furnace 22 which melts glass raw materials into molten glass 30, a float bath 26 which forms the molten glass into a glass ribbon 32 to be a glass substrate by floating the molten glass 30 supplied from the melting furnace 22 on the surface of molten tin 24, an annealing furnace 28 to anneal the glass ribbon 32, and an air spray gun 34 provided between the outlet of the float bath 26 and the inlet of the annealing furnace 28 with a height of 570 mm above the glass ribbon 32. The glass ribbon 32 which has left the annealing furnace 28 is cut by a cutting apparatus not shown to be a glass substrate.

A long chain alkyl-modified silicone oil (manufactured by Shin-Etsu Silicone, X-22-7322, exothermic peak temperature: 480° C., viscosity average molecular weight: 6,000) and a toluene (manufactured by JUNSEI CHEMICAL CO., LTD., boiling point: 110.7° C.) solution of aluminum acetylacetonate (manufactured by JUNSEI CHEMICAL CO.,

TABLE 1

| | Coating liquid | | | Evaluation | | | | |
|---|---|---|---|---|---|---|---|---|
| Ex. | Film component concentration in coating liquid [mass %] | Proportion of organopolysiloxane in coating liquid [mass %] | Proportion of organic aluminum complex in coating liquid [mass %] | Reduction in reflectance [%] | Increase a in transmittance before exposure test [%] | Increase b in transmittance after exposure test [%] | Moisture resistance (a − b) | Refractive index (n) |
| 1 | 70.5 | 70 | 0.5 | 1.99 | 1.91 | 1.73 | 0.18 | 1.38 |
| 2 | 71.5 | 70 | 1.5 | 2.07 | 1.76 | 1.38 | 0.38 | 1.41 |
| 3 | 75.0 | 70 | 5.0 | 1.99 | 1.64 | 1.30 | 0.34 | 1.41 |
| 4 | 85.0 | 70 | 15.0 | 1.32 | 1.07 | 0.74 | 0.34 | 1.42 |

As is shown in Table 1, the refractive indices of the glass substrates provided with an aluminum oxide-containing silicon oxide film produced by the production process of the present invention are so low as from 1.38 to 1.42. As described above, the refractive index of a glass substrate as LTD.) (aluminum acetylacetonate: 50 mass %, toluene: 50 mass %) are dissolved in n-decane (manufactured by KANTO CHEMICAL CO., INC., boiling point: 174.1° C.) to prepare a coating liquid with a solid content concentration of 70.5 mass %, a proportion of aluminum acetylacetonate in the solid content of 0.5 mass % and a mass ratio of aluminum acetylacetonate to the long chain alkyl-modified silicone oil of 0.007.

The coating liquid is sprayed from the spray gun 34 over the glass ribbon 32 moving at a transfer rate of 4.2 m/min, at a position between the float bath 26 and the annealing furnace 28 at which the surface temperature of the glass ribbon 32 is 600° C., at a liquid-sending rate of 36 kg/hr under a spraying pressure of 4.5 kg/cm² to form a film of the silicone oil on the glass ribbon 32, and then the silicone oil is thermally decomposed to form an aluminum oxide-containing silicon oxide film on the glass ribbon 32. Here, the refractive index of the glass ribbon 32 at a wavelength of 633 nm is 1.51.

INDUSTRIAL APPLICABILITY

According to the production process of the present invention, it is possible to produce a glass substrate provided with an aluminum oxide-containing silicon oxide film particularly being excellent in the moisture resistance, having a high light transmittance and having a low refractive index, and the glass substrate provided with an aluminum oxide-containing silicon oxide film produced by this process is useful as a cover glass for a solar cell, a protective plate for a display, glass for an automobile, glass for a railway vehicle, glass for shipping, glass for a building material, etc.

This application is a continuation of PCT Application No. PCT/JP2011/063178, filed on Jun. 8, 2011, which is based upon and claims the benefit of priority from Japanese Patent Application No. 2010-134186 filed on Jun. 11, 2010. The contents of those applications are incorporated herein by reference in its entirety.

REFERENCE SYMBOLS

10: glass substrate
26: float bath
28: annealing furnace
30: molten glass
32: glass ribbon
34: air spray gun

What is claimed is:

1. A process for producing a glass substrate provided with an aluminum oxide-containing silicon oxide film, comprising applying a coating liquid comprising an organopolysiloxane and an organic aluminum complex to a glass substrate which is at a temperature of from 400 to 650° C. to form an aluminum oxide-containing silicon oxide film on the glass substrate, wherein the content of the organic aluminum complex to the content of the organopolysiloxane in the coating liquid is from 0.005 to 0.25 by mass ratio.

2. The process according to claim 1, wherein the temperature of the glass substrate when the coating liquid is applied is at least 30° C. higher than the main exothermic peak temperature of the organopolysiloxane, and wherein said main exothermic peak temperature of the organopolysiloxane is at least 300° C. and is measured at a heating rate of 10° C./min.

3. The process according to claim 1, wherein the coating liquid further comprises a liquid medium.

4. The process according to claim 3, wherein the boiling point of the liquid medium is at least 60° C.

5. The process according to claim 1, wherein the organopolysiloxane is a silicone oil.

6. The process according to claim 5, wherein the silicone oil is a silicone oil represented by the following formula (1):

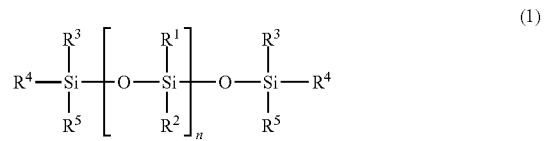

(1)

wherein each of $R^1$ to $R^5$ is an organic group or a hydrogen atom, and n is an integer of at least 1, provided that when $R^1$ to $R^5$ are organic groups, they may be the same or different.

7. The process according to claim 5, wherein the viscosity average molecular weight of the silicone oil is from 3,500 to 130,000.

8. A process for producing a glass substrate provided with an aluminum oxide-containing silicon oxide film, comprising forming molten glass into a glass ribbon, annealing the glass ribbon and cutting it to produce said glass substrate, wherein a coating liquid comprising an organopolysiloxane and an organic aluminum complex is applied to the glass ribbon at a position where the glass ribbon is at a temperature of from 400 to 650° C. to form an aluminum oxide-containing silicon oxide film on the glass ribbon, wherein the content of the organic aluminum complex to the content of the organopolysiloxane in the coating liquid is from 0.005 to 0.25 by the mass ratio.

9. The process according to claim 8,
wherein the temperature of the glass ribbon at the position where the coating liquid is applied is at least 30° C. higher than the main exothermic peak temperature of the organopolysiloxane, and wherein said main exothermic peak temperature of the organopolysiloxane is at least 300° C. and is measured at a heating rate of 10° C./min.

10. The process according to claim 8, wherein the molten glass is formed into a glass ribbon in a float bath, and the coating liquid is applied between the float bath and the annealing step or in the annealing step.

11. The process according to claim 8, wherein the coating liquid further comprises a liquid medium.

12. The process according to claim 11, wherein the boiling point of the liquid medium is at least 60° C.

13. The process according to claim 8, wherein the organopolysiloxane is a silicone oil.

14. The process according to claim 13, wherein the silicone oil is a silicone oil represented by the following formula (1):

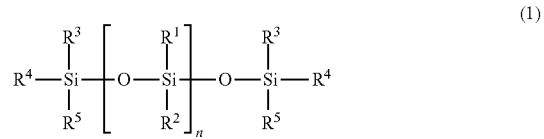

(1)

wherein each of $R^1$ to $R^5$ is an organic group or a hydrogen atom, and n is an integer of at least 1, provided that when $R^1$ to $R^5$ are organic groups, they may be the same or different.

15. The process according to claim 13, wherein the viscosity average molecular weight of the silicone oil is from 3,500 to 130,000.

* * * * *